March 26, 1957 E. BOLZONI 2,786,290

ROTATABLE DISC TELEPHONE INDEX

Filed June 3, 1953 2 Sheets-Sheet 1

INVENTOR

ERNESTO BOLZONI

BY

Bertram Ottinger

ATTORNEY

March 26, 1957 E. BOLZONI 2,786,290

ROTATABLE DISC TELEPHONE INDEX

Filed June 3, 1953 2 Sheets-Sheet 2

INVENTOR.
ERNESTO BOLZONI
BY
Bertram Ottinger
ATTORNEY

United States Patent Office 2,786,290

Patented Mar. 26, 1957

2,786,290

ROTATABLE DISC TELEPHONE INDEX

Ernesto Bolzoni, Milan, Italy, assignor to Emilio Ceretti, Milan, Italy

Application June 3, 1953, Serial No. 359,384

5 Claims. (Cl. 40—104)

This invention relates to a rotatable disc telephone index.

It is an object of my invention to provide an index of the character described which does away with the center opening in the index cards commonly found in indices of this general nature.

It is another object of my invention to provide an index of the character described in which individual index cards can be replaced without removing the entire pack of cards at such time.

It is another object of my invention to provide an index of the character described having a particularly simple hinging and spring loading of the cover.

Other objects of my invention will in part be obvious and in part will be pointed out hereinafter.

My invention accordingly consists in the features of construction, combinations of elements, and arrangements of parts which will be exemplified in the device described and of which the scope of application will be indicated in the appended claims.

In the accompanying drawings, in which is shown one of the various possible embodiments of my invention:

Figures 1, 2, 3:
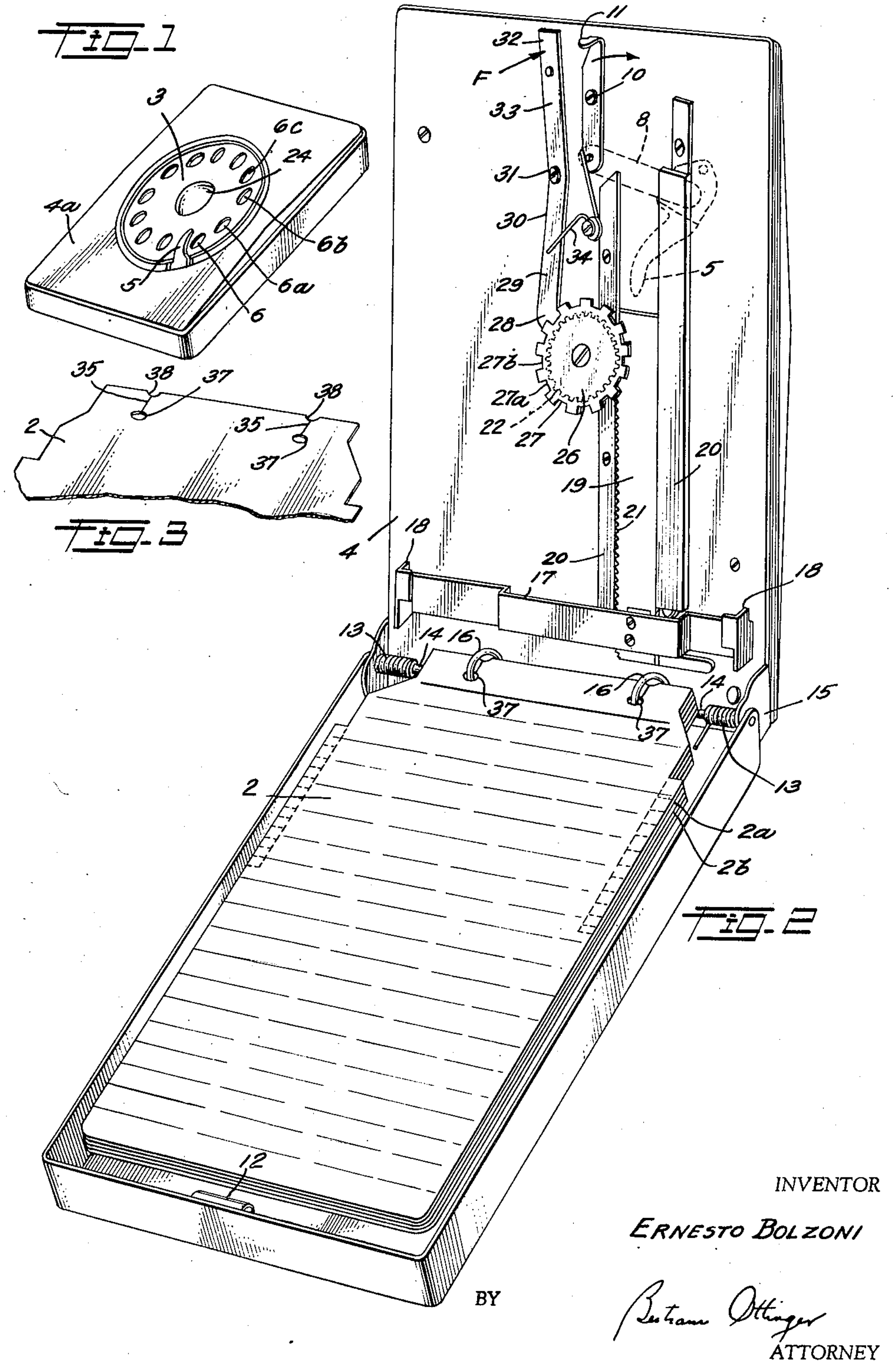
Fig. 1 represents in perspective an index realized according to the invention, on a reduced scale and closed.
Fig. 2 represents, on a greater scale, the index open.
Fig. 3 shows in particular the hinging of the cards.

With reference to the annexed drawings (Fig. 1) by 1 is indicated the case in which the cards 2, 2*a*, 2*b* etc. are contained, carrying the characters of the index that are to be drawn out by operating disc 3, rotatable on cover 4 of the case, which is provided with a plate 4*a* having a hole 4*b* in which disc 3 can freely rotate, while 5 indicates the appendage or stop in correspondence with which one of the openings 6, 6*a*, 6*b* etc. circularly arranged on the dial 3 and corresponding to the letters related to cards 2, 2*a*, 2*b* etc. of the index is to be brought.

To this end stop 5 (Figs. 2 and 4) of the rotatable disc is constituted by a lever fulcrumed at 7 on cover 4. It operates, by means of an arm 8 a spring-urged lever 9, pivoted at 10 and provided with a nose 11 for engagement with a projection 12 fixed to the case 1 of the index, cover 4 being constantly urged to open by the action of springs 13 (Fig. 2) located at the ends of a rod 14, which ends form pivots for hinging cover 4 by means of respective ears 15 carried by the latter.

According to the invention, cards 2, 2*a*, 2*b* etc. arranged on a support 2*n*, narrower than the width of the latter, can be withdrawn, that is, caused to rotate around their respective hinging means 16, by means of a card-engaging member constituted by a cross piece 17, whose ends 18 are bent inwards so that the longitudinal sides of cards 2, 2*a*, 2*b* etc. can freely slide between them (Fig. 4) said member 17 being carried by a bar 19 freely slideable between two guiding plates 20 and provided with teeth 21 engaged with the teeth of a corresponding gear 22 fixed to pin 23 of rotatable disc 3.

Figures 4, 5, 6, 7:
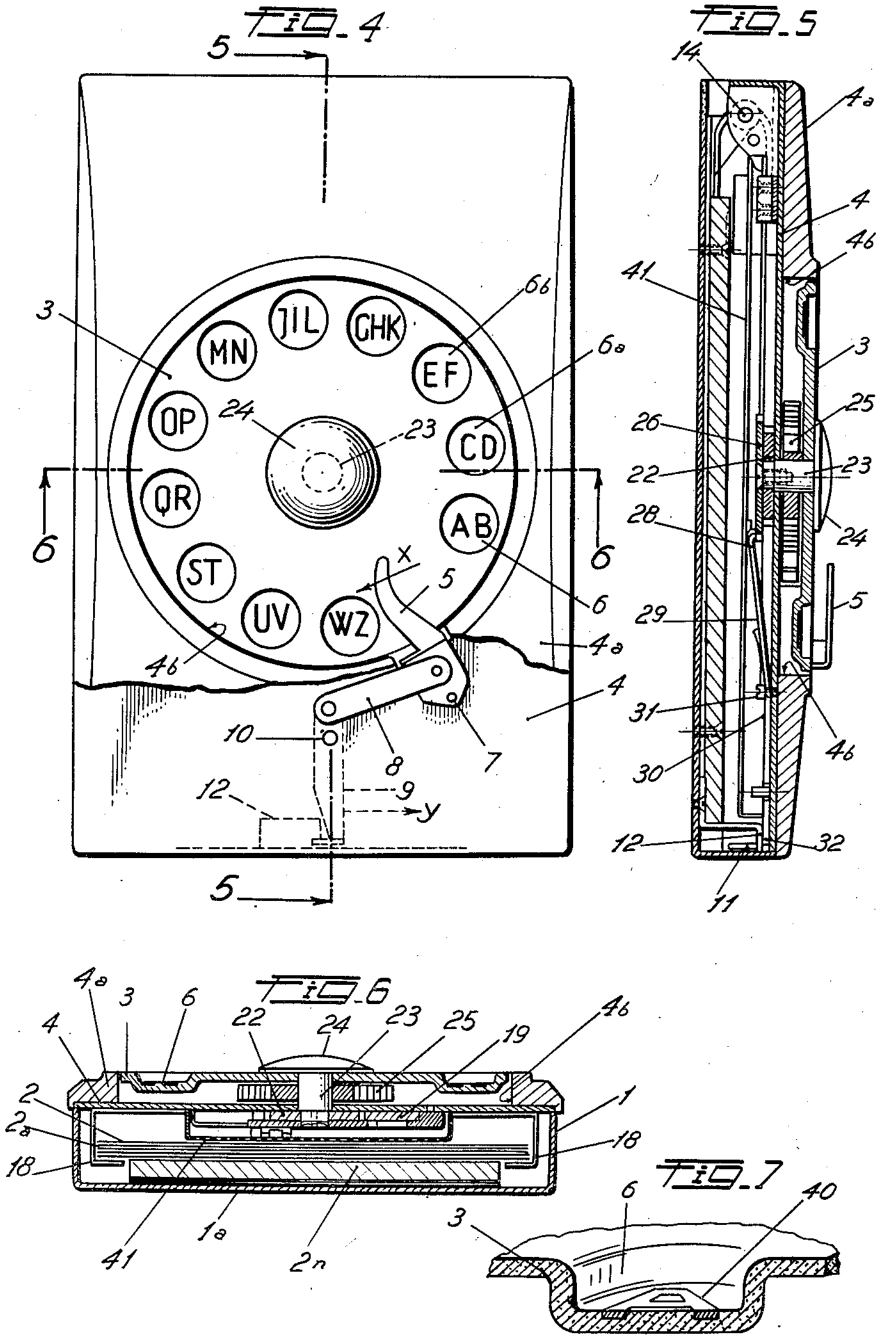
Fig. 4 shows the index closed, in a projection from above.
Fig. 5 represents a longitudinal section according to line 5—5 of Fig. 4.
Fig. 6 is a cross section according to line 6—6 of Fig. 4.
Fig. 7 shows particularly on an enlarged cross section the execution of the letters for the rotatable disc.

Pin 23 is supported by cover 4 and provided with a head 24 for stopping disc 3, which is biased to its rest position by the action of a per se known spring 25 (Fig. 4).

To lock the rotatable disc 3 in the place whereto it has been carried for the selection of the card corresponding to the respective character appearing at one of the openings 6, 6*a*, 6*b* etc. a locking member is provided, constituted by a wheel 26 (Figs. 2, 4, 5) rigidly fixed to said pin 23 on which gear 22 operating rack 19 is mounted, and provided at its periphery, with a plurality of notches 27, 27*a*, 27*b* etc. corresponding in number with openings 6, 6*a*, 6*b* etc. carried by rotatable disc 3. Into any one of said notches can engage a tooth 28 carried by the end of arm 29 of a lever 30, that can oscillate at 31 on cover 4, which lever, with the extremity 32 of its other arm 33 normally rests on bridge 12 (Fig. 5) engaging closure hook 11 of cover 4, so as to leave notches 27, 27*a*, 27*b* etc. of wheel 26 free when the index is closed, whereas when the latter is opened it provokes the locking of rotatable disc 3 in the place where it has been brought to by the user's finger. In fact the index cover 4 having been lifted by the pushing action exerted by spring 13, said extremity 32 has no more support and therefore lever 30 oscillates urged by the action of one of the arms of spring 34 and causes the engagement of tooth 28 with one of the corresponding notches 27, 27*a*, 27*b* etc. of said wheel 26, the other arm of spring 34 being charged with constantly recalling to the resting position the cover shutting hook 11.

After this description the operation of the index can be summarized up as follows.

The card corresponding to the character that is to be consulted having been decided upon and after having introduced the tip of a finger into the corresponding opening 6 of disc 3, the latter is caused to rotate until it meets with lever 5 (Fig. 3), which, oscillating in the direction indicated by arrow X (Fig. 4) will cause arm 9 to move in the direction Y and disengages itself from bridge 12 on case 1, thus allowing cover 4 to open, urged by springs 13.

Together with the angular rotation of wheel 26 and of its notches 27, 27*a*, etc. has also taken place (Figs. 2 and 5) of which the one corresponding to the desired letter will have arrived in a position for engagement with tooth 28 of lever 30, which, as soon as cover 4 is lifted through the action exerted by springs 13, forces its tooth 28 into engagement with the aforesaid tooth.

By closing cover 4, the end 32 of lever 30, meeting the surface of bridge 12 carried by case 1 (Fig. 2) is pushed in the direction of arrow F so as to free gear 26 from engagement with tooth 28 carried by the other arm 29 of lever 30, allowing therefore disc 3 to be carried by spring 25 into its initial position.

Rack 21 on flat 19 is also axially moved, carrying back its cross piece 17 to its initial position with card-engaging member 18 for the withdrawal of the cards 2, 2*a*, 2*b* etc.

According to the invention, the index cards 2, 2*a*, 2*b* etc. (Figs. 2 and 3), as has been hinted at, can be inserted or disinserted even one at a time from the index, without any necessity for withdrawing the whole card pack. To realize this, a cut 35 is provided, beginning from the edge 36 of the card and forward to hole 37, for the application of the card to the support 16. In this way, it is sufficient to exert a slight pressure on chamber 38 intended to facilitate the introduction of the card, so as to provoke the opening out of the sides corresponding to cut 35, which sides, on supports 16 having penetrated into their corresponding seats 37, will recover their flat position, so as to prevent the card from coming out of their hinges.

Fig. 7 illustrates the characteristic rotatable disc, preferably made of a synthetic resin or other material in whose openings 6, **6*a*, 6*b* etc. the characters 40** are laid by a second injection of a known synthetic resin. There is thus assured a longer life in respect to the similar known types, in which the characters can be worn out in practice by the user's finger nail tip while operating the disc.

41 is a housing (Figs. 5 and 6) for the levers and wheels applied to the inside face of cover 4.

Whereas a form of realization of a rotatable disc index according to the invention has been disclosed, it is understood that in practice numerous other forms based on the essential concepts governing the invention may be used, without departing from the spirit of the invention.

I claim:

1. A telephone index comprising a shallow case having an open top, a cover, means hinging the cover to the case along an edge of the case, a stack of centrally imperforate rectangular index cards disposed within the case, means hingedly mounting the cards in the case for rotation about an axis parallel to and adjacent that of the axis of rotation of the means hinging the cover to the case, a disc having a series of openings arranged in an arc about the center of the disc, said disc lying flat on the cover, means mounting the disc for rotation about its center on the cover, a stop member on the cover in the path of travel of a finger in an opening in the disc, releasable locking means connecting the cover to the case, means shiftably mounting the stop member on the cover for movement in the direction of a finger in an opening in the disc, means kinematically interconnecting the stop member and locking means to release the locking means when a finger in an opening presses against the stop member, a gear located on the underside of the cover and rotatable with the disc, a rack meshing with said gear, means mounting the rack on the cover for movement parallel to a set of edges of the cards perpendicular to the card hinging means, a card engaging member movable with the rack along and under a side of the stack, said cards having progressively stepped notches at the side of the stack along which the card engaging member moves, means to lock the rotatable disc in any angular position in which it is located when the cover opens, means to release the last-named locking means as the cover is closed, and means to bias the disc to an idle position in which the first opening is spaced from the stop member.

2. An index as set forth in claim 1 wherein duplicate cards engaging members are provided one at each of two opposite sides of the stack.

3. An index as set forth in claim 1 wherein the disc biasing means constitutes a flat spiral spring.

4. An index as set forth in claim 1 wherein the means to lock the rotatable disc comprises a notched wheel rotatable with the disc and a toothed member biased toward said wheel, and wherein the releasing means includes a cam carried by the case and engaging the toothed member when the cover is closed.

5. An index as set forth in claim 1 wherein the card mounting means includes at least two rings and each card has corresponding openings adjacent the hinged edge, each card further including a slit from the adjacent border of the card to the opening so as to permit the slit to be opened to admit the ring.

References Cited in the file of this patent

UNITED STATES PATENTS

| | | |
|---|---|---|
| 1,895,409 | Drucker | Jan. 24, 1933 |
| 2,223,966 | Peters | Dec. 3, 1940 |